US012589631B2

(12) United States Patent
Frykberg et al.

(10) Patent No.: US 12,589,631 B2
(45) Date of Patent: Mar. 31, 2026

(54) METHOD FOR CONTROLLING A REFRIGERATION SYSTEM OF A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Emil Frykberg, Gothenburg (SE); Henrik Fellbom, Gothenburg (SE); Kristian Nicklasson, Åsa (SE); Mikael Larsson, Hisings-Kärra (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 239 days.

(21) Appl. No.: 18/375,603

(22) Filed: Oct. 2, 2023

(65) Prior Publication Data

US 2024/0034125 A1    Feb. 1, 2024

Related U.S. Application Data

(63) Continuation of application No. PCT/CN2022/086602, filed on Apr. 13, 2022.

(30) Foreign Application Priority Data

Apr. 21, 2021    (EP) ..................................... 21169690

(51) Int. Cl.
*B60H 1/32*        (2006.01)
*B60H 1/00*        (2006.01)
(52) U.S. Cl.
CPC ........... *B60H 1/3207* (2013.01); *B60H 1/323* (2013.01); *B60H 1/00278* (2013.01);
(Continued)

(58) Field of Classification Search
CPC ...... B60H 1/3207; B60H 1/32; B60H 1/3204; B60H 1/3205; B60H 1/3227;
(Continued)

(56) References Cited

U.S. PATENT DOCUMENTS

| | | |
|---|---|---|
| 9,694,646 B2 | 7/2017 | Takeuchi |
| 9,780,422 B2 | 10/2017 | Dunn |

(Continued)

FOREIGN PATENT DOCUMENTS

| | | | | |
|---|---|---|---|---|
| CN | 110715466 A | * | 1/2020 | ............. F25B 13/00 |
| CN | 111146512 A | | 5/2020 | |

(Continued)

OTHER PUBLICATIONS

English translation of Zhang et al. (CN 110715466 A). (Year: 2020).*

(Continued)

*Primary Examiner* — Miguel A Diaz
(74) *Attorney, Agent, or Firm* — Tucker Ellis LLP

(57)        ABSTRACT

A method for controlling a refrigeration system of a vehicle includes a circuit containing a refrigerant, a compressor, and first and second evaporators which are connected in parallel to the compressor, and a first expansion valve arranged upstream the first evaporator that regulates a pressure drop of the refrigerant before the first evaporator, and a second expansion valve arranged upstream the second evaporator that regulates a pressure drop of the refrigerant before the second evaporator, and a condenser arranged downstream the compressor between the compressor and the first and second expansion valves. The method includes controlling a total opening of the first expansion valve and the second expansion valve, based on a temperature and a pressure of the refrigerant which refrigerant temperature and refrigerant pressure are measured downstream the first and second (Continued)

evaporators at a position between the first and second evaporators and the compressor.

11 Claims, 2 Drawing Sheets

(52) U.S. Cl.
CPC ................. *B60H 2001/325* (2013.01); *B60H 2001/3257* (2013.01); *B60H 2001/3285* (2013.01)

(58) Field of Classification Search
CPC .......... B60H 1/00278; B60H 2001/325; B60H 2001/3257; B60H 2001/3285; F25B 5/02; F25B 2600/0272; F25B 2700/1933; F25B 2700/21151; F25B 2341/0683
See application file for complete search history.

(56) References Cited

U.S. PATENT DOCUMENTS

2007/0193291 A1* 8/2007 Reddin ............. B60H 1/00357
62/239

2014/0373562 A1* 12/2014 Suzuki ...................... F25B 6/02
62/159

FOREIGN PATENT DOCUMENTS

| | | | |
|---|---|---|---|
| CN | 111288676 A | 6/2020 |
| CN | 111497550 A | 8/2020 |
| DE | 3743285 A1 | 6/1989 |
| DE | 19751702 A1 | 6/1998 |
| DE | 102017208231 A1 | 11/2018 |
| EP | 2075516 A2 | 7/2009 |
| EP | 3446899 A1 | 2/2019 |
| JP | 2007176302 A | 7/2007 |
| KR | 100927072 B1 | 11/2009 |
| KR | 101266435 B1 | 5/2013 |
| WO | 9103691 A1 | 3/1991 |

OTHER PUBLICATIONS

International Search Report from corresponding International Application No. PCT/CN2022/086602, mailed on Jul. 18, 2022, 3 pages.

\* cited by examiner

METHOD FOR CONTROLLING A REFRIGERATION SYSTEM OF A VEHICLE

RELATED APPLICATION DATA

This application is a continuation of International Patent Application No. PCT/CN2022/086602, filed Apr. 13, 2022, which claims the benefit of European Patent Application No. 21169690.1, filed Apr. 21, 2021, the disclosures of which are incorporated herein by reference in their entireties.

TECHNICAL FIELD

The invention relates to a method and a control unit for controlling a refrigeration system of a vehicle.

BACKGROUND

Electric vehicles and plug-in hybrid electric vehicles often have a refrigeration system with two evaporators connected in parallel to a compressor. Such a system is used for a HVAC function and cooling of batteries and motor.

Depending on various need of cooling and the flows of secondary fluids that are available, different cooling power distributions between the evaporators are desired. At the same time, the requisite superheat level of the refrigerant flowing to the inlet of the compressor has to be ensured.

SUMMARY

An objective of the invention is to provide a method for controlling a refrigeration system of a vehicle, by which method the superheat level of the refrigerant can be ensured at the same time as the desired cooling power distribution between two evaporators of the system can be achieved.

The objective is achieved by a method for controlling a refrigeration system of a vehicle, where the refrigeration system comprises a circuit containing a refrigerant, a compressor, and a first evaporator and a second evaporator which are connected in parallel to the compressor, and a first expansion valve arranged upstream the first evaporator, which first expansion valve regulates the pressure drop of the refrigerant before the first evaporator, and a second expansion valve arranged upstream the second evaporator, which second expansion valve regulates the pressure drop of the refrigerant before the second evaporator, and a condenser arranged downstream the compressor between the compressor and the first and second expansion valves, where the method comprises controlling a total opening of the first expansion valve and the second expansion valve, based on a temperature and a pressure of the refrigerant, which refrigerant temperature and refrigerant pressure are measured downstream the first and second evaporators at a position between the first and second evaporators and the compressor.

The invention is based on the insight that by such a method, the issues of ensuring the requisite superheat level of the refrigerant and achieving the desired cooling power distribution between the evaporators can be separated. A target superheat level at the outlet of each evaporator is not required, and there is no need of temperature sensors for measuring the temperature of the refrigerant at each outlet of the evaporators.

According to one embodiment, the method comprises controlling the total opening of the first expansion valve and the second expansion valve, based on a superheat control error being a difference between a superheat value which is a function of the refrigerant temperature and the refrigerant pressure, and a superheat target value. Hereby, the target superheat can be achieved, further reducing the risk of liquid refrigerant entering the compressor.

According to a further embodiment, the method comprises controlling an opening of the first expansion valve, based on a temperature of a first secondary fluid measured when the first secondary fluid has passed the first evaporator and a temperature of a second secondary fluid measured when the second secondary fluid has passed the second evaporator. Hereby, the number of sensors used in the system is minimized.

A liquid coolant such as water can be used as one of the first secondary fluid and the second secondary fluid. Air or a further liquid coolant can be used as the other of the first secondary fluid and the second secondary fluid. For example, heat from the batteries and/or the electric motor, and from the cabin of the vehicle, can be transferred to the first evaporator and the second evaporator, respectively.

According to a further embodiment, the method comprises controlling the opening of the first expansion valve, based on a first temperature control error being a difference between the temperature of the first secondary fluid and a target temperature, and a second temperature control error being a difference between the temperature of the second secondary fluid and a target temperature, and preferably based on a difference between the first temperature control error and the second temperature control error. Hereby, it is ensured that the fraction assigned to the first evaporator of the refrigeration system's total cooling power can be adapted to the relationship between the need of cooling of the first secondary fluid and that of the second secondary fluid.

According to a further embodiment, the method comprises controlling an opening of the second expansion valve to be the remaining fraction of the total opening of the first expansion valve and the second expansion valve after being reduced by the fraction assigned to be the opening of the first expansion valve. Hereby, it is ensured that the control unit distributing the refrigeration system's total cooling power between the first and second evaporators is not affecting the total opening area of the first and the second expansion valve.

The invention also relates to a control unit for controlling a refrigeration system of a vehicle. The advantages of the control unit are similar to the advantages already discussed hereinabove with reference to the different embodiments of the method.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
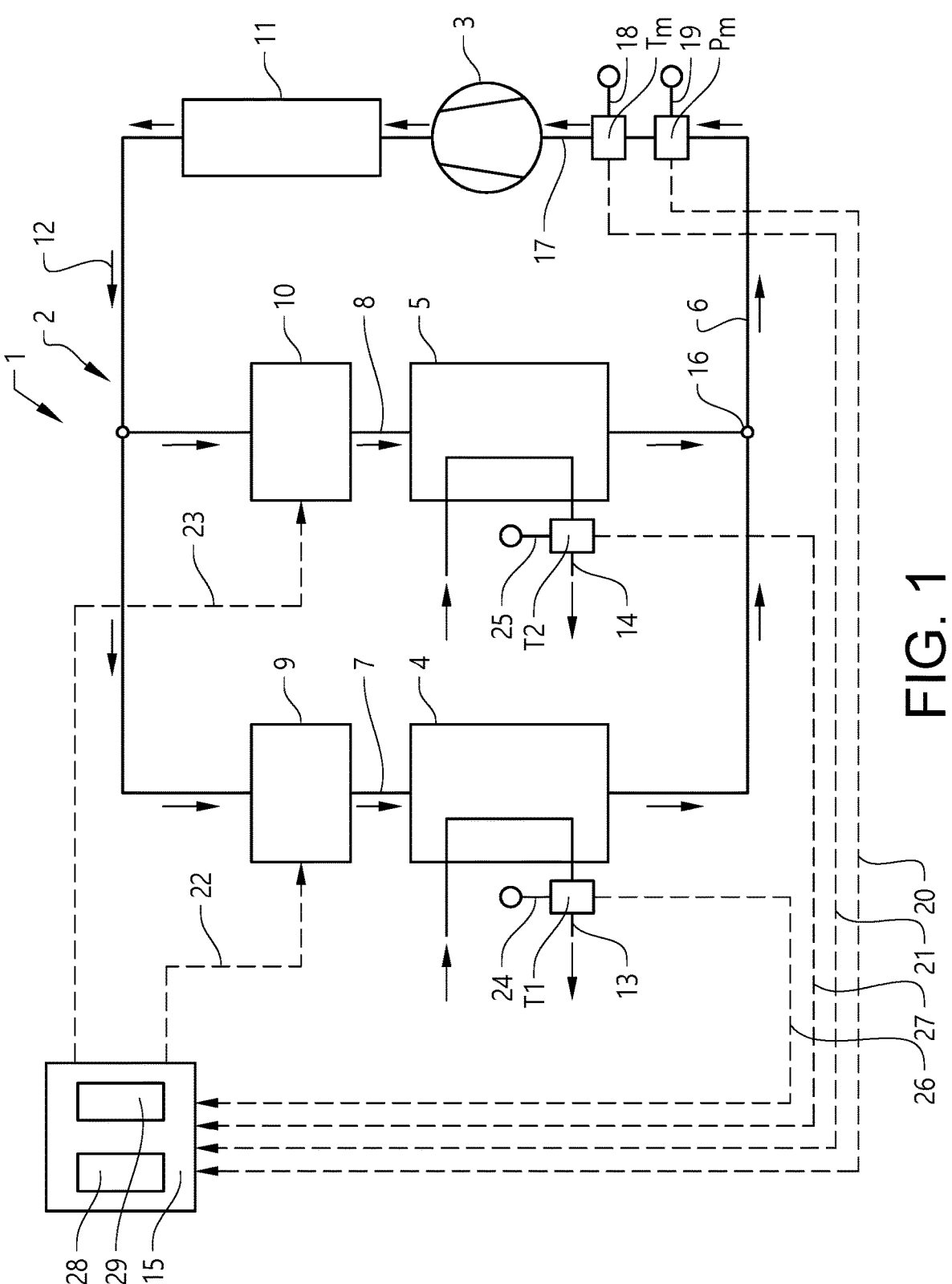
FIG. 1 shows a refrigeration system for a vehicle.

FIG. 1 is a schematical illustration of a refrigeration system 1 for a vehicle. The refrigeration system 1 comprises a circuit 2 containing a refrigerant, a compressor 3, and a first evaporator 4 and a second evaporator 5 which are connected in parallel to the compressor 3. The circuit 2 has a main circuit 6, a first subcircuit 7 for the first evaporator 4 and a second subcircuit 8 for the second evaporator 5. The compressor 3 is arranged in the main circuit 6 for compressing the refrigerant or working fluid circulating in the circuit 2 of the refrigeration system 1. The compressor 3 can be driven by an electric motor (not shown).

The refrigeration system 1 further comprises a first expansion valve 9 arranged upstream the first evaporator 4 in the first subcircuit 7 and a second expansion valve 10 arranged upstream the second evaporator 5 in the second subcircuit 8. The first expansion valve 9 is arranged to regulate a pressure drop of the refrigerant before the first evaporator 4 and the second expansion valve 10 is arranged to regulate a pressure drop of the refrigerant before the second evaporator 5. In addition to lowering the pressure of the refrigerant, the first and second expansion valves 9, 10 are used for controlling the distribution of the refrigerant flow between the first evaporator 4 and the second evaporator 5. In other words; the flow of the refrigerant in the main circuit 6 is divided into a first flow passing through the first subcircuit 7 and a second flow passing through the second subcircuit 8.

Further, a condenser 11 is suitably arranged in the main circuit 6 downstream the compressor 3 between the compressor 3 and the first and second expansion valves 9, 10. In operation, heat can be transferred from the surrounding to the refrigerant at the first and second evaporators 4, 5, and heat can be transferred from the refrigerant to the surrounding at the condenser 11.

The operating principle of the refrigeration system 1 can be as follows. The refrigerant being in gaseous state is pressurized and circulated through the system by the compressor 3. The flow of refrigerant in the main circuit 6 is controlled by the operation of the compressor 3. After passing the compressor 3 the hot and highly pressurized refrigerant is cooled in the condenser 11 until the refrigerant condenses into a high-pressure liquid having a lower temperature.

A first part of the condensed refrigerant passes through the first expansion valve 9, and the remaining part of the condensed refrigerant passes through the second expansion valve 10. The low-pressure refrigerant in the first subcircuit 7 then enters the first evaporator 4, where the refrigerant absorbs heat and is evaporated, and the low-pressure refrigerant in the second subcircuit 8 then enters the second evaporator 5, where the refrigerant absorbs heat and is evaporated. Thereafter, the partial flows of refrigerant returns to the main circuit 6 and the compressor 3, and the cycle is repeated. The circulating direction of the refrigerant (to which the expressions upstream and downstream refer) in the circuit 2 is indicated by arrows 12.

As schematically illustrated in FIG. 1, the first and second evaporators 4, 5 work as heat exchangers. Heat is transferred to the refrigerant from a first secondary fluid 13 when passing the first evaporator 4, and heat is transferred to the refrigerant from a second secondary fluid 14 when passing the second evaporator 5.

When the refrigeration system 1 is applied on a vehicle, a liquid coolant such as water can be used as one of the first secondary fluid and the second secondary fluid. For example, the first secondary fluid 13 can be water. Air or a further liquid coolant can be used as the other of the first secondary fluid and the second secondary fluid. For example, the second secondary fluid 14 can be air.

Further, heat from an electric motor, batteries or any other component and/or from a cabin of the vehicle that needs to be cooled, can be transferred to the first evaporator 4 and the second evaporator 5 by means of the first and second secondary fluids 13, 14. In addition, the condenser 11 can transfer heat to the surrounding air and/or the cabin and/or to any other component of the vehicle that needs to be heated. The heat from the condenser 11 can be transferred from the refrigerant to air or to another working fluid.

FIG. 1 shows a control unit 15 for controlling the refrigeration system 1. The control unit 15 is configured to control a total opening of the first expansion valve 9 and the second expansion valve 10, based on a temperature $T_m$ and a pressure $p_m$ of the refrigerant which refrigerant temperature and refrigerant pressure are measured downstream the first and second evaporators 4, 5 at a position between the first and second evaporators 4, 5 and the compressor 3 in the main circuit 6. Although the refrigerant temperature $T_m$ and the refrigerant pressure $p_m$ can be measured at any position between a point 16, where the first subcircuit 7 and the second subcircuit 8 merge into the main circuit 6, and the compressor inlet 17, the refrigerant temperature $T_m$ and the refrigerant pressure $p_m$ are suitably measured close to the compressor inlet 17.

For measuring the refrigerant temperature $T_m$ and the refrigerant pressure $p_m$, a temperature sensor 18 and a pressure sensor 19, respectively, can be used. Signals 20, 21 from the temperature sensor 18 and the pressure sensor 19 are transmitted to the control unit 15.

In the example embodiment illustrated, the control unit 15 is configured to control the total opening of the first expansion valve 9 and the second expansion valve 10, based on a superheat control error $\Delta SH$ being a difference between a superheat value SH which is a function of the refrigerant temperature $T_m$ and the refrigerant pressure $p_m$, and a superheat target value $SH_{target}$. As illustrated in FIG. 1, control signals 22, 23 are transmitted from the control unit 15 for controlling the opening of the first expansion valve 9 and the opening of the second expansion valve 10.

The total opening of the first expansion valve 9 and the second expansion valve 10, is the sum of the opening degree of the first expansion valve 9 and the opening degree of the second expansion valve 10. The degree of opening of the individual expansion valves 9, 10 can be controlled based on the desired cooling power distribution between the first evaporator 4 and the second evaporator 5.

In the example embodiment illustrated, the control unit 15 is configured to control an opening of the first expansion valve 9, based on a temperature T1 of the first secondary fluid 13 measured when the first secondary fluid 13 has passed the first evaporator 4 and a temperature T2 of the second secondary fluid 14 measured when the second secondary fluid has passed the second evaporator 5.

The first secondary fluid temperature T1 and the second secondary fluid temperature T2 can be measured by temperature sensors 24, 25, preferably at the outlets of the first and second evaporators. Signals 26, 27 from the temperature sensors 24, 25 are transmitted to the control unit 15.

The control unit 15 is suitably configured to control the opening of the first expansion valve 9, based on a first temperature control error $\Delta T1$ being a difference between the temperature T1 of the first secondary fluid and a target temperature $T1_{target}$, and a second temperature control error $\Delta T2$ being a difference between the temperature T2 of the second secondary fluid and a target temperature $T2_{target}$, and preferably the control unit 15 is configured to control the opening of the first expansion valve 9, based on a difference between the first temperature control error ΔT1 and the second temperature control error ΔT2.

Further, the control unit 15 can be configured to control an opening of the second expansion valve 10 to be the remaining fraction of the total opening of the first expansion valve 9 and the second expansion valve 10 after being reduced by the fraction assigned to be the opening of the first expansion valve 9.

The control unit 15 may comprise one or more microprocessors and/or one or more memory devices or any other components for executing computer programs or receiving and/or sending control signals for providing the control function. Particularly, the control unit is preferably provided with a computer program comprising program code means for performing all steps of any embodiment of the method described herein. The control unit can be a separate component or be integrated in another controller. The control unit can be arranged to control other components of the refrigeration system. For example, the control unit is suitably arranged to control the compressor.

The control unit 15 may comprise one or more controllers of the type P, PI or PID or combinations thereof. For example, the control unit 15 can comprise a first PID controller 28 for controlling the total opening of the first expansion valve and the second expansion valve, based on the superheat control error ΔSH, and a second PID controller 29 for controlling the opening of the first expansion valve, based on the difference between the first temperature control error ΔT1 and the second temperature control error ΔT2.

Figure 2:
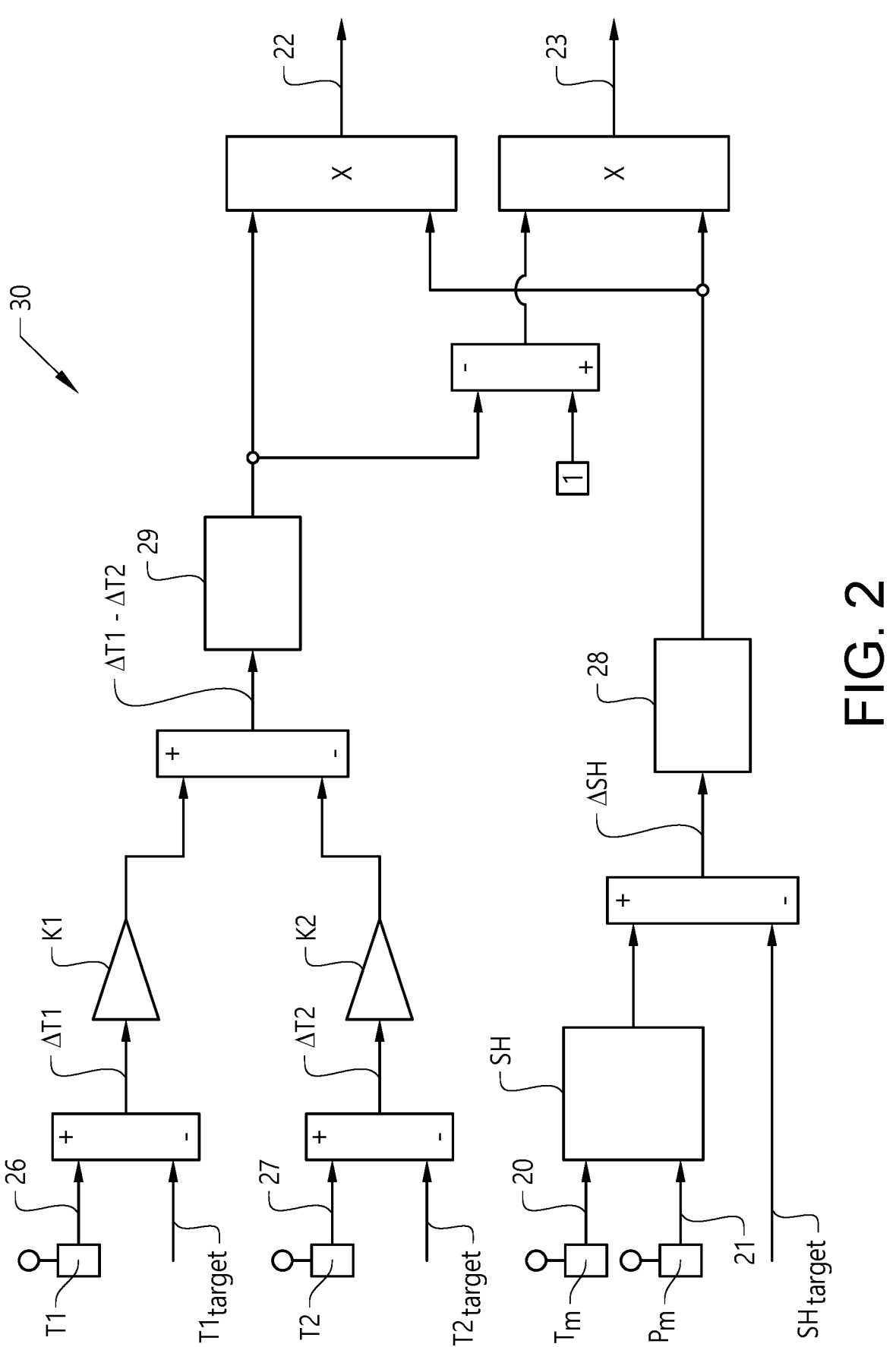
FIG. 2 is a control diagram of a control unit for controlling the refrigeration system.

FIG. 2 shows a control diagram 30 of the control unit 15 for controlling the refrigeration system 1. Reference is made to the control diagram 30 in FIG. 2 (and to the refrigeration system 1 in FIG. 1), for illustrating an example embodiment of the method. The method comprises controlling the total opening of the first expansion valve and the second expansion valve, based on the temperature $T_m$ and the pressure $p_m$ of the refrigerant which refrigerant temperature and refrigerant pressure are measured downstream the first and second evaporators at a position between the first and second evaporators and the compressor.

The method further comprises controlling the total opening of the first expansion valve and the second expansion valve, based on the superheat control error ΔSH being the difference between the superheat value SH which is a function of the refrigerant temperature $T_m$ and the refrigerant pressure $p_m$, and the superheat target value $SH_{target}$.

The first PID controller 28 of the control unit 15 is used for controlling the total opening of the first expansion valve and the second expansion valve.

In the illustrated example embodiment, the method further comprises controlling the opening of the first expansion valve, based on the temperature T1 of the first secondary fluid measured when the first secondary fluid has passed the first evaporator and the temperature T2 of the second secondary fluid measured when the second secondary fluid has passed the second evaporator.

The method comprises controlling the opening of the first expansion valve, based on the first temperature control error ΔT1 being the difference between the temperature T1 of the first secondary fluid and the target temperature $T1_{target}$, and the second temperature control error ΔT2 being the difference between the temperature T2 of the second secondary fluid and the target temperature $T2_{target}$. The method further comprises controlling the opening of the first expansion valve, based on the difference between the first temperature control error ΔT1 and the second temperature control error ΔT2. The second PID controller 29 of the control unit 15 is used for controlling the opening of the first expansion valve.

The first temperature error ΔT1 and the second temperature error ΔT2 can be modified by scaling factors K1 and K2 for achieving the system behaviour that is desired.

The method further comprises controlling the opening of the second expansion valve to be the remaining fraction of the total opening of the first expansion valve and the second expansion valve after being reduced by the fraction assigned to be the opening of the first expansion valve.

It is to be understood that the present invention is not limited to the embodiments described above and illustrated in the drawings; rather, the skilled person will recognize that many changes and modifications may be made within the scope of the appended claims.

What is claimed is:

1. A method for controlling a refrigeration system of a vehicle, the refrigeration system comprising a circuit containing a refrigerant, a compressor, and a first evaporator and a second evaporator which are connected in parallel to the compressor, and a first expansion valve arranged upstream the first evaporator, which first expansion valve regulates a pressure drop of the refrigerant before the first evaporator, and a second expansion valve arranged upstream the second evaporator, which second expansion valve regulates a pressure drop of the refrigerant before the second evaporator, and a condenser arranged downstream the compressor between the compressor and the first and second expansion valves, the circuit having a main circuit, a first subcircuit for the first evaporator and a second subcircuit for the second evaporator, wherein controlling a total opening of the first expansion valve and the second expansion valve, based on a temperature and a pressure of the refrigerant which refrigerant temperature and refrigerant pressure are measured downstream the first and second evaporators at a position between the first and second evaporators and the compressor in the main circuit, the measuring position being situated between a point, where the first subcircuit and the second subcircuit merge into the main circuit, and an inlet of the compressor, and wherein controlling an opening of the first expansion valve, based on a temperature of a first secondary fluid measured when the first secondary fluid has passed the first evaporator, and a temperature of a second secondary fluid measured when the second secondary fluid has passed the second evaporator, and wherein controlling an opening of the second expansion valve to be a remaining fraction of the total opening of the first expansion valve and the second expansion valve after being reduced by a fraction assigned to be the opening of the first expansion valve.

2. The method according to claim 1, wherein controlling the total opening of the first expansion valve and the second expansion valve, based on a superheat control error being a difference between a superheat value which is a function of the refrigerant temperature and the refrigerant pressure, and a superheat target value.

3. The method according to claim 1, wherein controlling the opening of the first expansion valve, based on a first temperature control error being a difference between the temperature of the first secondary fluid and a first target temperature, and a second temperature control error being a difference between the temperature of the second secondary fluid and a second target temperature.

4. The method according to claim 3, wherein controlling the opening of the first expansion valve, based on a difference between the first temperature control error and the second temperature control error.

5. The method according to claim 1, wherein using a liquid coolant as one of the first secondary fluid and the second secondary fluid.

6. The method according to claim 5, wherein using air or a further liquid coolant as the other of the first secondary fluid and the second secondary fluid.

7. A control unit for controlling a refrigeration system of a vehicle, the refrigeration system comprising a circuit containing a refrigerant, a compressor, and a first evaporator and a second evaporator which are connected in parallel to the compressor, and a first expansion valve arranged upstream the first evaporator, which first expansion valve regulates a pressure drop of the refrigerant before the first evaporator, and a second expansion valve arranged upstream the second evaporator, which second expansion valve regulates a pressure drop of the refrigerant before the second evaporator, and a condenser arranged downstream the compressor between the compressor and the first and second expansion valves, the circuit having a main circuit, a first subcircuit for the first evaporator and a second subcircuit for the second evaporator, wherein the control unit is configured to control a total opening of the first expansion valve and the second expansion valve, based on a temperature and a pressure of the refrigerant which refrigerant temperature and refrigerant pressure are measured downstream the first and second evaporators at a position between the first and second evaporators and the compressor in the main circuit, the measuring position being situated between a point, where the first subcircuit and the second subcircuit merge into the main circuit, and an inlet of the compressor, and wherein the control unit is configured to control an opening of the first expansion valve, based on a temperature of a first secondary fluid measured when the first secondary fluid has passed the first evaporator, and a temperature of a second secondary fluid measured when the second secondary fluid has passed the second evaporator, and wherein the control unit is configured to control an opening of the second expansion valve to be a remaining fraction of the total opening of the first expansion valve and the second expansion valve after being reduced by a fraction assigned to be the opening of the first expansion valve.

8. The control unit according to claim 7, wherein the control unit is configured to control the total opening of the first expansion valve and the second expansion valve, based on a superheat control error being a difference between a superheat value which is a function of the refrigerant temperature and the refrigerant pressure, and a superheat target value.

9. The control unit according to claim 7, wherein the control unit is configured to control the opening of the first expansion valve, based on a first temperature control error being a difference between the temperature of the first secondary fluid and a first target temperature, and a second temperature control error being a difference between the temperature of the second secondary fluid and a second target temperature.

10. The control unit according to claim 9, wherein the control unit is configured to control the opening of the first expansion valve, based on a difference between the first temperature control error and the second temperature control error.

11. A non-transitory computer readable medium storing a computer program comprising program code for performing a method according to claim 1.

* * * * *